(12) United States Patent
Konieczny et al.

(10) Patent No.: US 8,190,274 B2
(45) Date of Patent: May 29, 2012

(54) METHOD AND CONTROL DEVICE FOR CONTROLLING AN AUTOMATING SYSTEM (75) Inventors: Frank Konieczny, Lemgo (DE); Dietmar Krumsiek, Emmerthal (DE); Thorsten Behr, Honr-Badmeinberg (DE); Anja Kruse, Lemgo (DE); Ralf Aron, Detmold (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 66 days.

(21) Appl. No.: 12/450,844

(22) PCT Filed: Apr. 15, 2008

(86) PCT No.: PCT/EP2008/002985
§ 371 (c)(1),
(2), (4) Date: Dec. 18, 2009

(87) PCT Pub. No.: WO2008/125336
PCT Pub. Date: Oct. 23, 2008

(65) Prior Publication Data
US 2010/0114336 A1 May 6, 2010

(30) Foreign Application Priority Data
Apr. 15, 2007 (DE) .......................... 10 2007 017 945

(51) Int. Cl.
*G05B 11/01* (2006.01)
*G05B 15/00* (2006.01)
*G06F 9/44* (2006.01)
*G06F 15/16* (2006.01)

(52) U.S. Cl. ................ 700/17; 700/20; 700/83; 700/87; 709/218; 709/223; 717/168; 717/170; 717/172

(58) Field of Classification Search ................ 700/17, 700/20, 83, 86–87; 717/168, 170, 172; 709/218, 709/223
See application file for complete search history.

(56) References Cited

U.S. PATENT DOCUMENTS
5,508,689 A * 4/1996 Rado et al. .................. 340/3.1
(Continued)

FOREIGN PATENT DOCUMENTS
DE 10214539 10/2003
(Continued)

OTHER PUBLICATIONS
English translation of International Preliminary Report and Written Opinion dated Nov. 10, 2009 for corresponding International Application No. PCT/EP2008/002985.
(Continued)

*Primary Examiner* — Ramesh Patel
(74) *Attorney, Agent, or Firm* — Ohlandt, Greeley, Ruggiero & Perle, LLP (57) ABSTRACT

Methods for accessing a control module that can be executed in a control device of an automating system are provided. The method includes the steps of providing the control module in the control device; providing a first interface module in the control device; providing a second interface module in the control device; connecting the control device with an operating device via a network; transferring the second interface module from the control device to the operating device, whereby the operating device comprises input and output devices for operation by a user; executing the second interface module by the operating device; and transferring data between the first and the second interface modules.

24 Claims, 5 Drawing Sheets

U.S. PATENT DOCUMENTS

| | | | |
|---|---|---|---|
| 5,799,067 A * | 8/1998 | Kikinis et al. | 379/93.06 |
| 5,805,442 A * | 9/1998 | Crater et al. | 700/9 |
| 5,911,047 A * | 6/1999 | Kim et al. | 709/222 |
| 6,195,591 B1 * | 2/2001 | Nixon et al. | 700/83 |
| 6,271,844 B1 * | 8/2001 | Selles | 715/853 |
| 7,010,396 B2 * | 3/2006 | Ware et al. | 700/284 |
| 7,233,830 B1 * | 6/2007 | Callaghan et al. | 700/9 |
| 7,586,900 B2 * | 9/2009 | Lee | 370/352 |
| 7,693,581 B2 * | 4/2010 | Callaghan et al. | 700/9 |
| 7,882,209 B1 * | 2/2011 | Eslambolchi et al. | 709/223 |
| 7,882,269 B2 * | 2/2011 | Pritchett et al. | 709/250 |
| 2004/0236443 A1 | 11/2004 | Ware et al. | |
| 2010/0030346 A1 * | 2/2010 | Watanabe | 700/7 |

FOREIGN PATENT DOCUMENTS

| | | |
|---|---|---|
| DE | 10355160 A1 | 6/2005 |
| DE | 102005018246 A1 | 10/2006 |
| EP | 0917034 | 5/1999 |
| EP | 1445673 | 8/2004 |
| WO | WO99/63409 | 12/1999 |
| WO | WO02/31608 | 4/2002 |

OTHER PUBLICATIONS

European Office Action dated Mar. 26, 2010 for corresponding European Patent Application No. 08 735 248.0 (with English translation).
International Search Report and Written Opinion based on corresponding International application No. PCT/EP2008/002985 dated Oct. 27, 2008.
Campbell, Ryan, "Preloading Data with Ajax and JSON," Internet Article, pp. 1-8, Jan. 24, 2006.
Neuhaus, Sven, "JSON and JSON-RPC: Ajax ohne XML," IX, Magazine Fur Professionelle Informationstechnik, p. 70, Jan. 2006.
Branch, M. et al., "Real-Time Web-Based System Monitoring," Conf. Record of the 2006 IEEE IAS Pulp and Paper Conf., 4 pp., 2006.
Office Action for corresponding German Patent Application No. 10 2008 019 040.3-55 dated Jul. 16, 2009.

* cited by examiner

METHOD AND CONTROL DEVICE FOR CONTROLLING AN AUTOMATING SYSTEM

The invention generally relates to automating systems and particularly to a method and a control device for controlling an automating system.

The principle of memory-programmable control (SPS) is already approximately 30 years old today and with the increasing maturity of the market, construction and mode of operation are less differentiated. The fundamental operating principle is based on detecting the current status of the plant/machine to be automated and transforming the corresponding physical process signals into electrical signals by appropriate sensors. In addition to the central processing unit with programming memory and processor as well as the input/output units, an appropriate PC-based programming device or Windows-based development tool for creating the control program is also a part of the basic configuration of an SPS today, while the corresponding startup phase via interplay with the actual machine and plant—is generally called engineering.

For the user, the manipulation of the control is essentially determined by the programming system by means of which the user creates an automating task, inputs it into the device and puts it in operation. The state of the art here is that for the control, the appropriate programming software is provided as a Windows application, which must be installed for this purpose on an appropriately equipped Windows PC. In the case of controls of the lowest performance class—so-called control relay substitutions—variants have been known for several years, which can also be programmed via a display placed directly on the device (e.g., Moeller easy and Siemens LOGO!). The solutions that are available in this case, however, are limited to a simple representation with only a few lines, which is hardly suitable for creating and maintaining extensive programs and do not suffice for presenting more complex relationships.

The object of the invention is based on indicating a way for improving and simplifying the manipulation and utilization of automating systems, in particular, memory-programmable controls (SPS).

This object is accomplished by a method according to claim 1, as well as a control device according to claim 16. Advantageous embodiments and enhancements are described in the respective subclaims.

Correspondingly, a method according to the invention serves for accessing a control module that can be designed in a control device for controlling an automating system, wherein the control module is designed so as to execute a function on the control device. The method provides that the control module as well as a first and a second interface module are supplied in the control device, the control device is connected to an operating device via a network, the second interface module is transferred from the control device to the operating device, whereby the operating device comprises input and output devices for operation by a user, the second interface module is executed by the operating device, and data are transmitted between the first and second interface modules.

The data transfer between the first and second interface modules preferably serves for the purpose of creating, processing and/or executing a control function that can be executed on the control device by the control module, transferring parameters to the control device and/or reading out process data from the control device.

The control device can be designed as any device that participates in the control of a process of an automating system. Accordingly, the phrase "control device" designates, for example, a sensor, an actor, a device for the input or output of process, parameter or control data, or a device for controlling, monitoring, creating protocols for, operating and/or observing a process. The control module, which is also called a control engine in the following, is preferably designed as a software module for controlling functions of the control device, whereby these functions are typically designed as software applications, which are integrated in the control module or are filed in a separate memory of the control device. The functions may advantageously comprise security-directed automating functions or also a combination of security-directed and non-security-directed automating functions.

The control device particularly advantageously comprises a memory-programmable control (SPS), wherein the function controlled by the software module is designed as a control program for process control of the automating system.

The execution of engineering tasks is made possible in a particularly advantageous way by the method, wherein a typical classification of engineering tools for creating an automating system comprises the following as tools: the control configuration, program editors, an HMI designer, and a data monitor. The control configuration comprises, for example, the I/O configuration, the configuration of the communication networks, as well as assigning parameters for the device. Both text as well as graphic editors can be utilized as program editors. An HMI designer typically serves for creating graphic objects and for operating and observing pages that can be displayed in a Web browser. A data monitor, for example, is used for observing and recording binary or analog signals that are internal and/or external to the control.

The corresponding engineering application is preferably executed on the operating device, whereby the latter advantageously comprises a Web browser for this purpose. The respective engineering application exchanges data with the control module on the control device via the first and second interface modules. The data are transferred between the first and second interface modules in response to user inputs on the operating device in an advantageous embodiment of the method.

The transfer of data between the first and the second interface modules can be initiated both by the operating device as well as by the control device; however, each time this depends on the application objective, for example, it depends on the engineering application executed in each case.

In a particularly advantageous embodiment of the method, the first interface module comprises an HTTP server application and the second interface module comprises a client application designed for communication with the HTTP server application. The network is correspondingly designed, preferably as an IP-based network.

The second interface module preferably comprises a Web-based application which is designed for execution in a Web browser. A particularly advantageous embodiment provides that the communication between first and second interface modules is conducted by means of AJAX technology (Asynchronous JavaScript and XML) with the use of JSON (JavaScript Object Notation).

In this way, for example, the programming of a control can be conducted in a simple way directly via a standard browser without specific enhancements, whereby all information necessary for the product use of the control originates from the control itself and is made available via an existing, known standard environment. Clear advantages result thereby in comparison to a traditional configuration with a self-contained software tool.

Based on the special requirements in the field of industrial control, the control module and/or the first interface module preferably comprise an intermediate code, in particular an intermediate code corresponding to the CIL (Common Intermediate Language) standard, such as is provided by the .NET language family, for example.

Further, the control device advantageously comprises a module for providing a runtime environment, which is designed for the purpose of executing the control module and the first interface module in parallel. In a particularly preferred embodiment of the method, the data are transferred from the first to the second interface module and the data received by means of the first interface module are processed by the control device at pre-established times, wherein the times for the real-time requirements set by the process for the execution of the control module are dynamically adapted to the running time, wherein further, the control module is advantageously executed with a higher priority than the first interface module. In this way, real-time requirements set by the respective automating process can be maintained in a particularly advantageous manner.

The control device is typically connected to process components by means of which changes are made in the process run. For the offline operation of a control function, it is further provided within the scope of the invention that the operating device and the control module are disposed in a common computer system and the process controlled by the control module is simulated by a simulation module.

A control device of a control system according to the invention for the control of an automating system, particularly designed for executing the above-described method, comprises a memory with a control module stored therein for the process control of the automating system and a first and a second interface module stored therein, wherein the control module is designed for the purpose of executing a function on the control device, a processor unit for executing the control module and the first interface module, and a network interface for connecting the control device with a network, wherein the control device is designed for the purpose of transferring the second interface module to an operating device via the network, and the first interface module is designed for the purpose of communicating with the second interface module disposed in the operating device via the network.

The invention further provides advantageous embodiments of a control device that comprises means that are suitable for the purpose of executing the above-described advantageous configurations of the method according to the invention.

Correspondingly, the second interface module is preferably designed for the purpose of initiating a data transfer to the first interface module. Further, as a function of data received via the first interface module, the control device is advantageously designed for the purpose of providing the creating, processing, executing and/or parameterizing of a control function that can be executed on the control device by the control module. The control device particularly advantageously comprises a memory-programmable control (SPS) for process control.

As has already been described above, the first interface module preferably comprises an HTTP server application, which is designed for communication with a remote client application disposed in the second interface module, the network preferably being designed as an IP-based network for this purpose. The client application preferably comprises a Web-based application, which is designed for execution in a Web browser.

As has already been described above, the control device can be any device that participates in the control of a process of an automating system. In a preferred embodiment, the control device is designed for control of a real-time process. For this purpose, the control module and/or the first interface module preferably comprises an intermediate code, in particular corresponding to the CIL (Common Intermediate Language) standard.

Analogous to the above-described advantageous configuration of the method, the control device advantageously comprises a module for providing a runtime environment, which is designed for the purpose of executing the control module and the first interface module in parallel. Further, the control device is advantageously designed for the purpose of transferring data from the first to the second interface module and for processing the data received by means of the first interface module at pre-established times, whereby the times can be adapted dynamically to the runtime for the real-time requirements set by the process for executing the control module. The control device is particularly advantageously designed to execute different software modules with different priorities, wherein, in particular, the control module is executed with a higher priority than the first interface module, in order to maintain real-time requirements that are established in advance by the process. For process control, the control device can be connected preferably with process components that are designed for effecting changes in the process run.

The invention advantageously provides the physical integration of the control device and the control programming, whereby it is possible to transfer this to standard devices by means of known Web 2.0 technologies, in particular technologies known under the name Ajax. In the typical application case today, this is a notebook computer with a Windows operating system, but it can also be, for example, a Linux or Mac OS computer, as well as also new device classes, such as Ultra Mobile PCs (UMPCs), PDAs, Webpads and modern generations of cell phones.

Working with a browser is a daily activity all over the world for many people, due to the enormous spread of the Internet. The invention accordingly makes it possible to be able to carry out with special advantage the programming of a control directly via a standard browser without specific enhancements. All information necessary for the product use of the control originates from the control itself and is made available via an existing, known standard environment. The following fundamental advantages result thereby in comparison to a traditional configuration with a self-contained software tool:

specific software as well as its installation are not necessary, inconsistencies or version conflicts between the device and the separate software tool are not possible, a separate project management with the inconsistencies associated therewith is not necessary, the current project is always the one that controls the application directly, engineering that is platform-independent is made possible, wherein, e.g., embedded devices (Web-Pad), MAC OS (Apple), Linux and Windows (PCs) are supported, since the prerequisite is still only the availability of an appropriate Web browser.

The invention will be described in more detail below on the basis of preferred embodiments and with reference to the appended drawings. The same reference numbers in the drawings designate the same or similar components. Herein.

Figure 1:
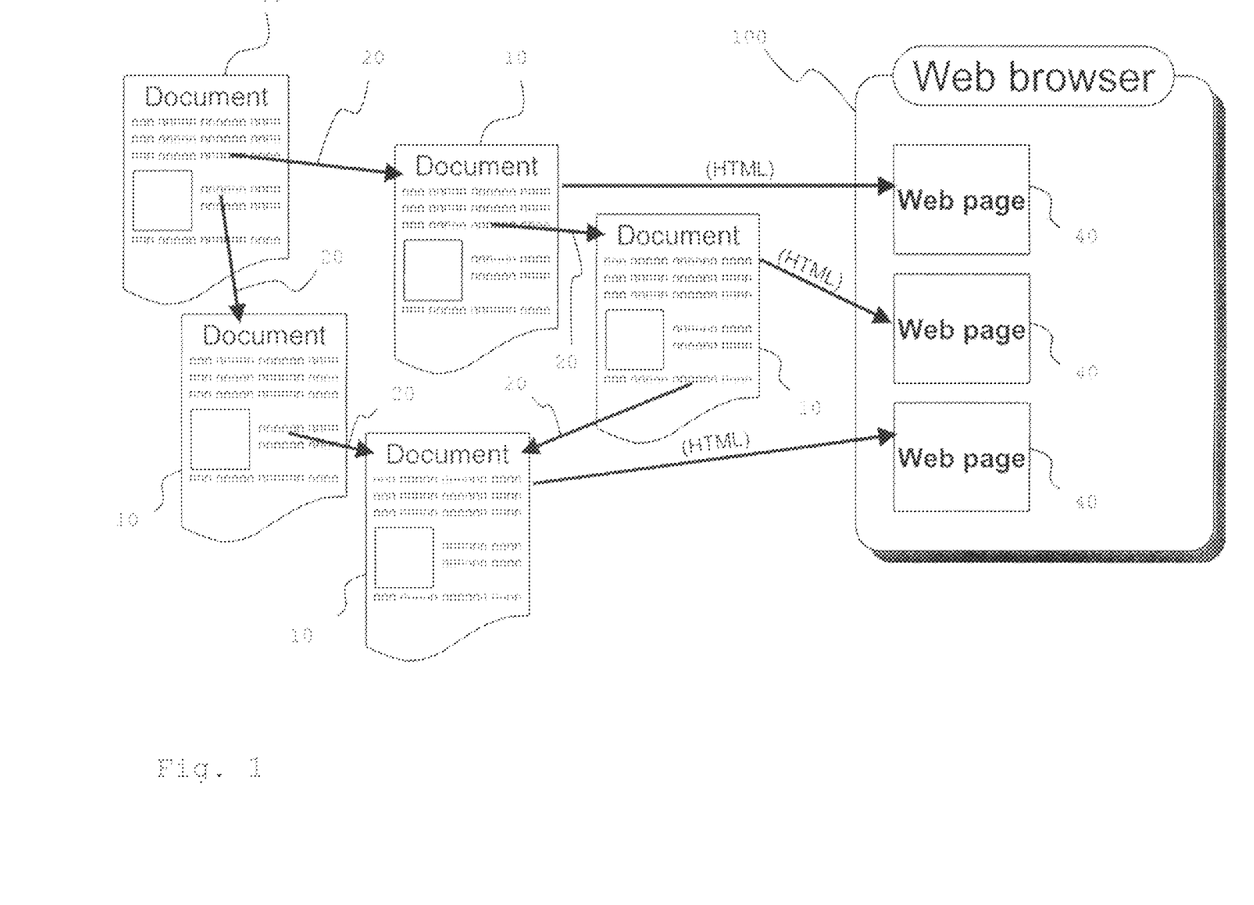
FIG. 1 shows schematically an information system according to the prior art.

It is known to utilize the World Wide Web (WWW) as the infrastructure for the worldwide distribution of information. Such an information system is shown in FIG. 1. In this case, hypermedia documents 10 connected via (hyper) links 20 form a network of information, and Web browser 100 is the terminal for this network. The request for a Web page 40 is made by inputting a URL in the address line of the Web browser 100. The Web server addressed in this way sends the requested HTML document 10 to browser 100, which then displays it correspondingly. If the presented content of the page shall be changed, then this must be done via a new request in the Web server and a repeated transfer of the complete page to browser 100—the user sees a sequence of static pages 40.

With the Internet boom from the middle of the 90's of the last century, the WWW was expanded to additional fields of application, in particular, to the virtual marketplace and Web stores that have arisen within the scope of e-business and electronic commerce. Particularly known forms of e-commerce applications are book and music shipments and Internet auctions. Quickly, more was expected from an online store than static HTML pages and this has led to the development of dynamic server-side Web applications.

Figure 2:
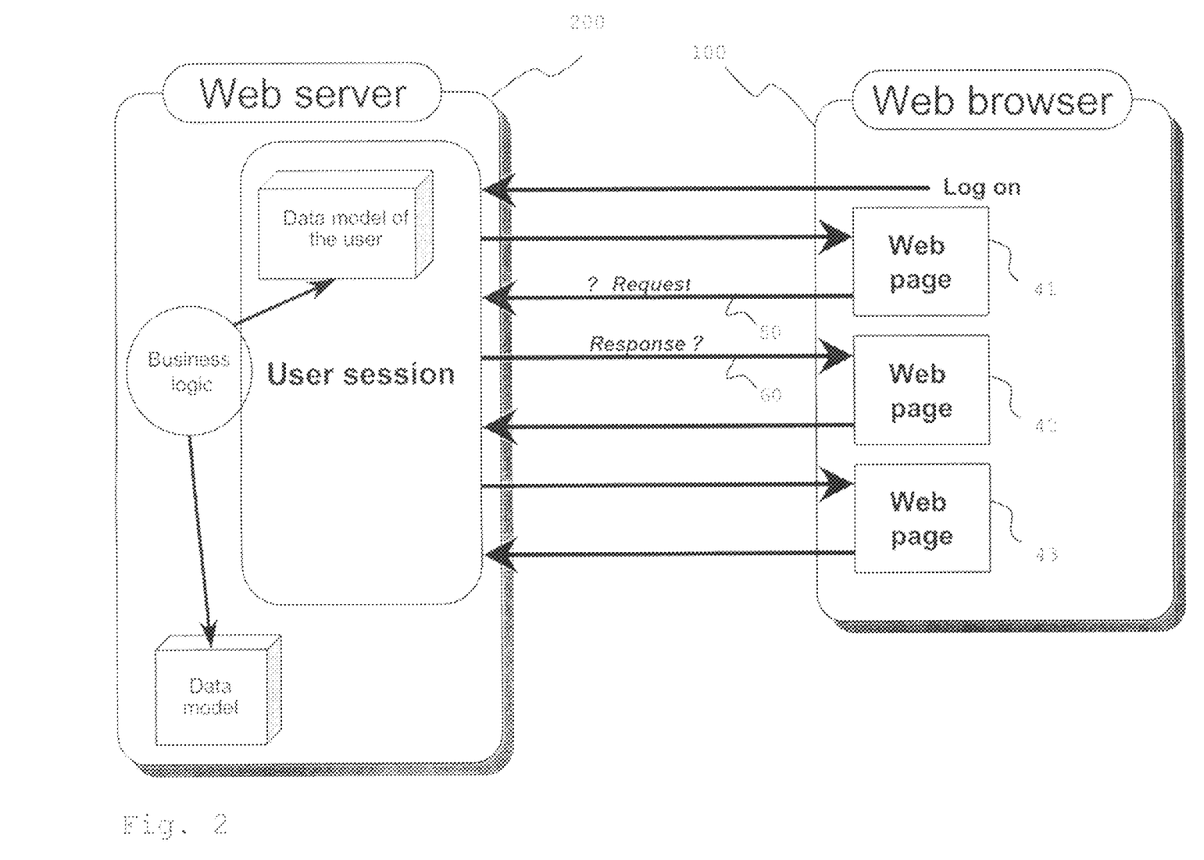
FIG. 2 shows schematically the structure of a classical server-side Web application.

In the case of Web applications with dynamic server-side pages, a Web page 41, 42 or 43 is first generated on the basis of the request of the browser to the server. FIG. 2 shows the structure of a classical server-side Web application, in which the interactions between user and application are developed via the Web server 200. In each interaction in browser 100, a request 50 is made to server 200, which generates a new document 42 and sends a response 60 to browser 100, in which standard representations and user-specific data are mixed in a stream comprised of HTML markup-browser 100 discards the previous document 41 and shows the new document 42.

The essential basic principle of Ajax, in contrast, is to abandon this classical page-based application model, in which the browser is utilized only as a passive terminal, and to shift a part of the application logic from the server to the browser.

Ajax (asynchronous JavaScript and XML) was coined as a term at the beginning of 2005 by Jesse James Garrett of Adaptive Path in his essay "Ajax: A New Approach to Web Applications" and describes a concept of how, with already existing technologies—in the JavaScript kernel or core and the XML HTTP request-object—the conventional request/response model of the classical Web application can be replaced by separation into a front-end application—which is stored in the browser—and a back-end application on the server, which are combined via an asynchronous communication. The motivation for Ajax described by Jesse James Garrett is to approximate the behavior of Web applications to that of a pure desktop application. Corresponding to this definition, an Ajax Web application is an application which operates exclusively as a runtime environment in a Web browser, but simultaneously is represented as a desktop application in the alignment of its interaction with the user.

Examples of this are, e.g., the web-based word-processing programs ajaxWrite (http://us.ajax13.com/en/ajaxwrite/) or Writely (http://docs.google.com/) which are oriented to Microsoft WORD with their user interface.

AJAX is described, for example in the article found on the Web page "http://www.heise.de/ix/artikel/2005/11/056/", whereby the content of this Web page at the time point of the application is incorporated herein by reference.

Figure 3:
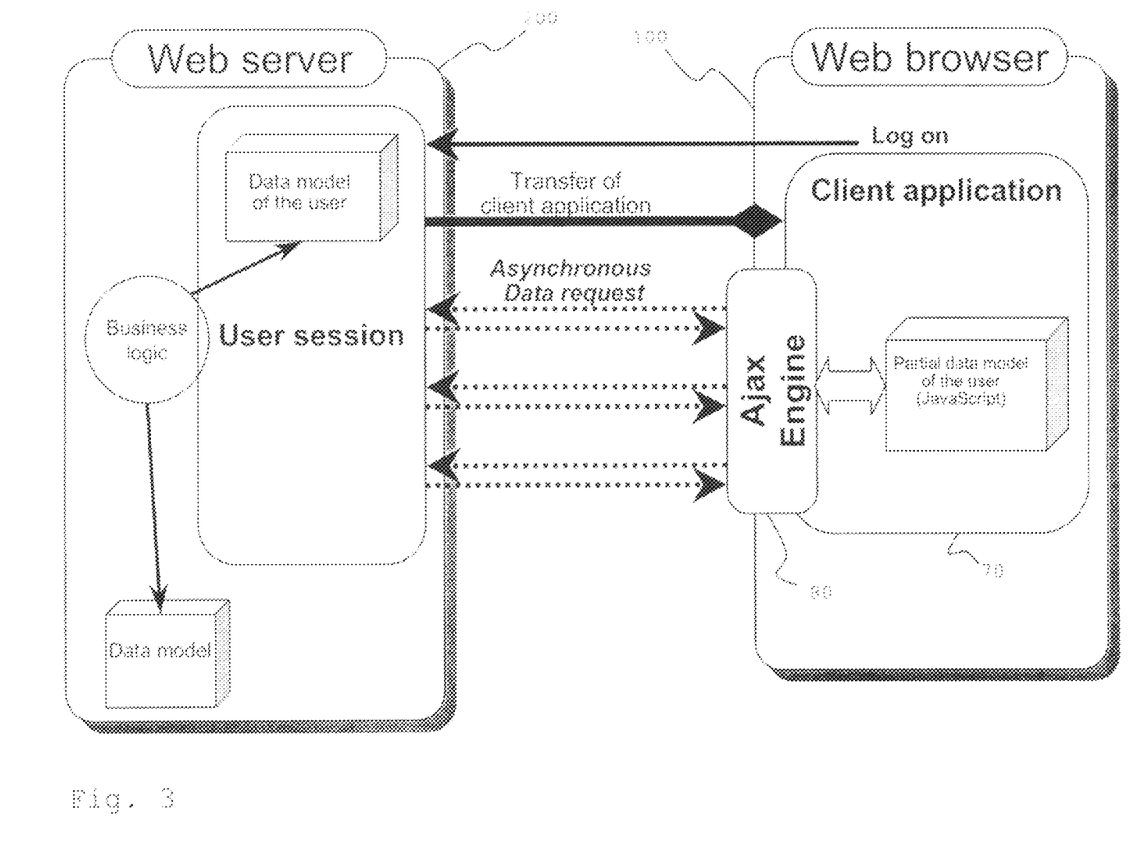
FIG. 3 shows schematically the basic structure of an Ajax-based Web application.

In the ideal case, an Ajax Web application would not be distinguished from a desktop application in the view of a user. In order to achieve this, in the case of an Ajax Web application, the user interface 70 is moved to Web browser 100 and decoupled from communication with Web browser 200 via a so-called Ajax engine 80, as shown in FIG. 3, which shows the basic structure of an Ajax-based Web application. According to this concept, user interfaces can be constructed which behave like a desktop application as far as the user is concerned, since they can operate independent of the latency time of the HTTP communication.

Ajax is a concept that describes how different, known Web technologies will be utilized and combined with one another, in order to create interactive, desktop-like Web applications. It describes the introduction and utilization of technologies, but not the structure of the Web application itself.

Figure 4:
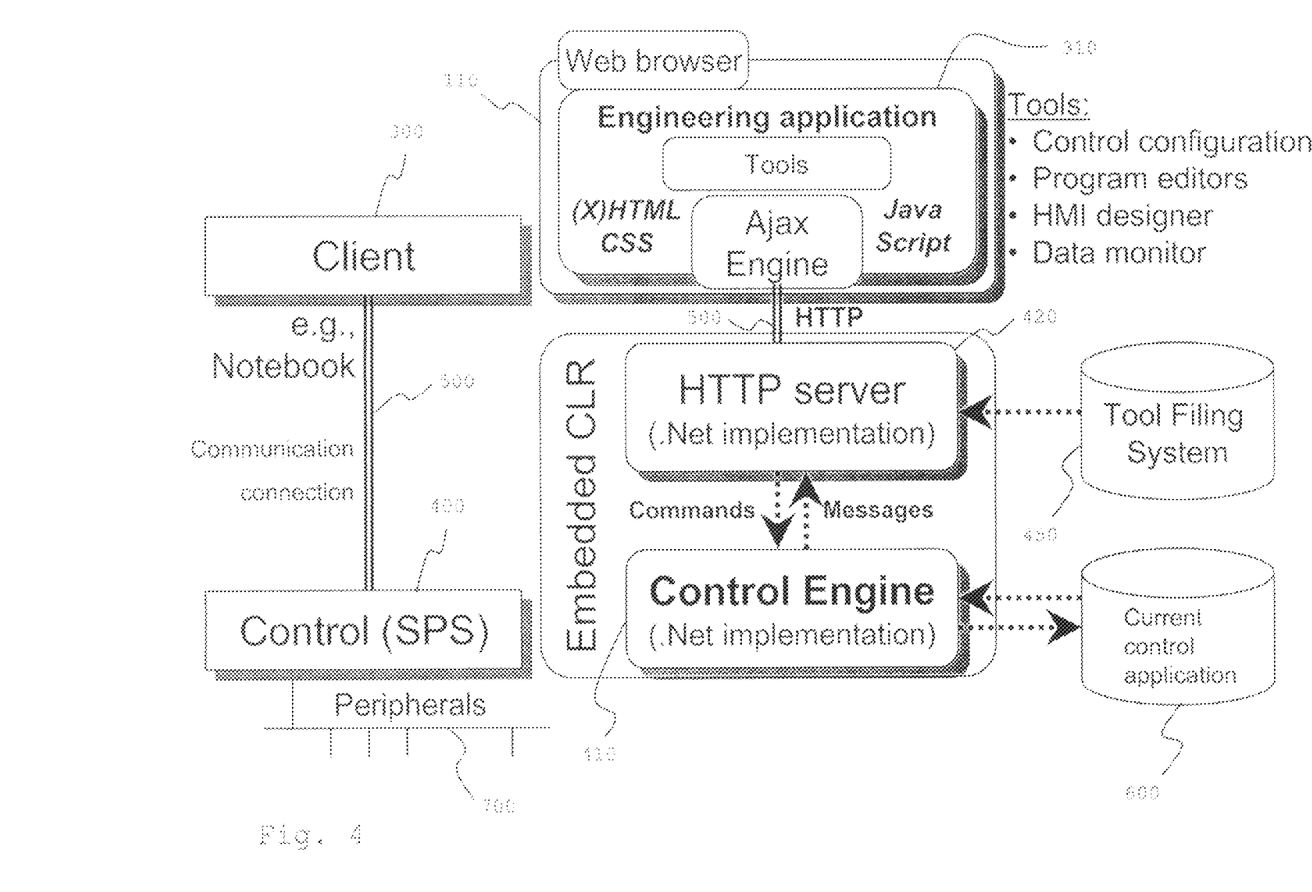
FIG. 4 shows a schematic representation of the basic components of a control system for controlling an automating system according to a first preferred embodiment of the present invention, designed for the execution of a method according to the invention.

Particularly advantageously, the invention makes possible a Web or browser-based engineering application, in particular with the use of Ajax, for a memory-programmable control (SPS), whose basic components are shown in FIG. 4.

The components shown in FIG. 4 comprise an operating device designed as an engineering computer 300 and a control device designed as a memory-programmable control (SPS) 400, which are designed for the execution of a method according to the invention.

Engineering computer 300 and control 400 are connected to one another via a communication connection 500 via a physical cable or a wireless connection, which is in a position to transmit Hypertext Transfer Protocol (HTTP), e.g., Ethernet TCP/IP. The core of control 400 is a control engine 410, which executes control application 600 by controlling the process connected via the peripheral 700 corresponding to this application 600. This application 600 is created, launched and maintained via the engineering application 310, which is created on the basis of Web technologies HTML or XHTML, CSS and JavaScript and is completely executed in a Web browser 110 as a standard runtime environment—alternatively, the engineering of the application is also possible via a self-contained Windows application.

All components of engineering application 310 are filed in a file system on control 400. By entering the URL of control 400 in the address line of browser 110, the HTML start page is loaded from the file system. This HTML page contains the software components of the engineering application 310 in the form of JavaScript code. Browser 110 executes this code and in this way makes engineering application 310 available to the user. After starting the engineering application 310, the current control application 600 is loaded from control engine 410 and the instantaneous status of the control is presented to the user. The control application 600 can now be operated in engineering application 310 by the user—for this purpose, additional components (tools) are subsequently loaded from tool filing system 450 onto control 400, corresponding to the selected processing steps. If control application 600 is constructed in a modular manner, then only the parts of it that the user has selected correspondingly and would like to observe or process are loaded in engineering application 310. This modular loading limits the components and data to be transferred to the necessary components and in this way reduces the resource requirement for communication and thus reduces wait times for the user.

With this concept, an HTML page is loaded on the page of the application particularly advantageously only once upon starting. This basic application (home page) contains the user interface and the infrastructure components of engineering application 310 directly or via references to separate files. Special tools may also be loaded only when these are required by the user for processing the corresponding data of the application—preferably they are loaded in the background and loading is controlled by the basic application.

JavaScript infrastructure components comprise, for example, operating elements or components for communication. Engineering tools or tools for special tasks comprise, for example, tools for control configuration, program editors, an HMI designer or a data monitor.

The data of control application 600 are loaded into browser 110 for processing by engineering application 310 and presented to the user and can be manipulated via these tools. In this way, only the parts of control application 600 that are required for the instantaneous application scenario are transferred from control engine 410 into engineering application 310. Only after a processing step is completed are the processed parts of the control application from the engineering application 310 transferred back to the current control application 600 via control engine 410. The data are processed exclusively in engineering application 310 in browser 110, so that the resources of control 400 are freed up therefrom.

The communication between control engine 410 of control 400 and engineering application 310 in browser 110 is conducted exclusively via HTTP server 420, which also operates on control 400.

Figure 5:
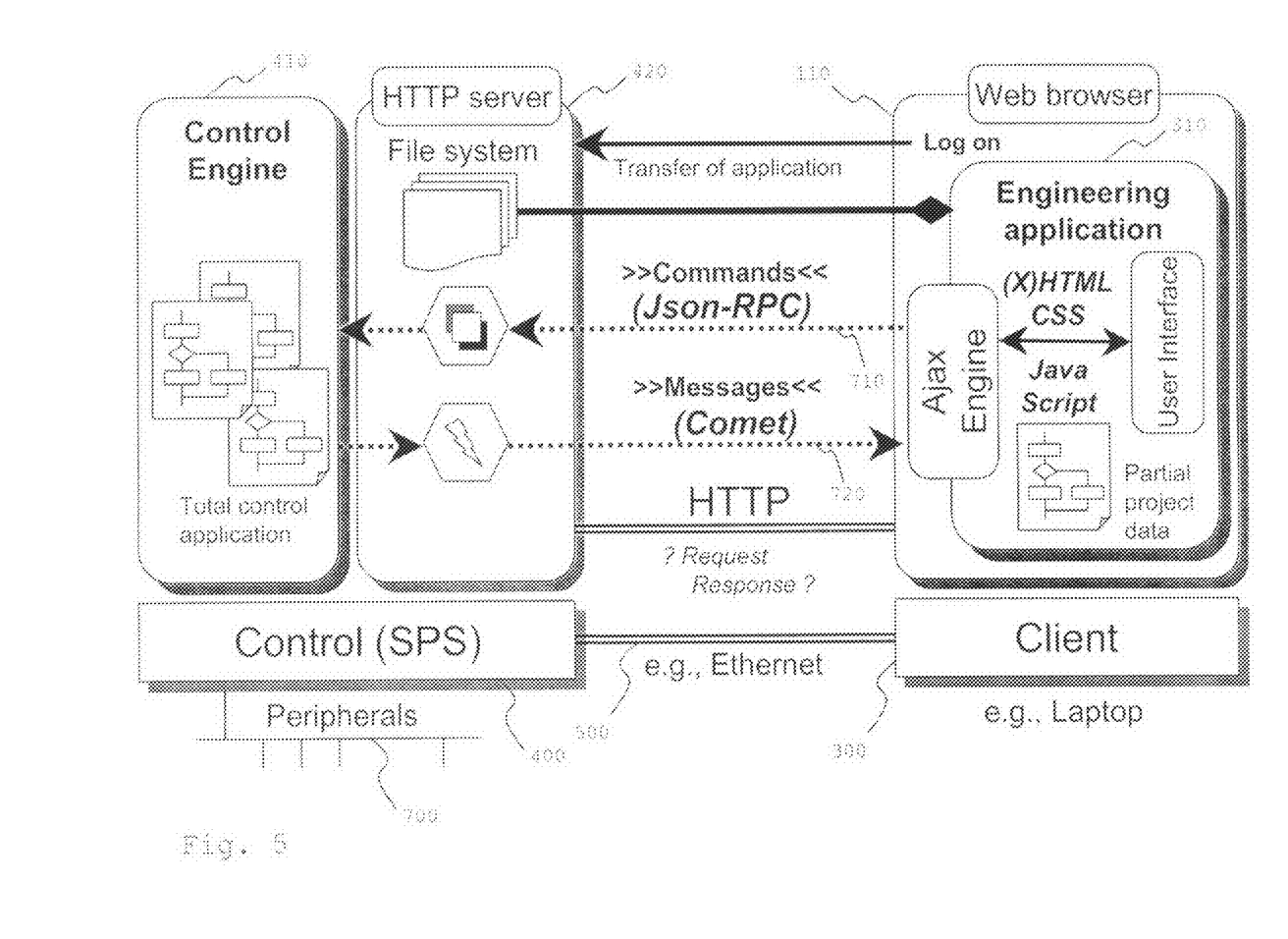
FIG. 5 shows schematically the HTTP-based communication mechanisms of the Web-based control system shown in FIG. 4.

FIG. 5 shows the HTTP-based communication mechanisms of the described Web-based control system. Corresponding to the initiation of the information exchange, a distinction is made between commands, which are triggered by engineering application 310, and messages, which are triggered by events in control engine 410.

Examples of commands are:
Start/stop cyclical processing of the control application
Reset, basic state of the control engine
Upload/download, load or rewrite control application or parts thereof
Requests for current status of the control engine
Request for current processing status of the control application
Request for current status of the connected peripherals (inputs/outputs)
Set up a list of individual statuses or status objects of the control application and the connected peripherals (inputs/outputs) to be observed
Examples of messages are:
Status and error messages of the control engine
Status and error messages of the control application
Change in status for observation of communicated statuses or status objects of the control application and the connected peripherals (inputs/outputs)
Notification of changes in the control application Basically, the communication between a Web browser and a Web server is provided via the transaction-oriented Hypertext Transfer Protocol (HTTP). Corresponding to the client/server architecture of the WorldWideWeb, a transaction is always initiated by the client (browser) by generating a request for this and sending it to a server. The server concludes the transaction by generating a response and sending it back to the client. Modern browsers offer the possibility of directly sending HTTP requests from a JavaScript application running in the browser and accepting HTTP responses via a mechanism called an XMLHttpRequest.

A command is the triggering of an action in control engine 410 by a processing step of engineering application 310. Since engineering application 310 and control engine 410 operate in different processes and typically also on separate computers with different runtime environments, a transport mechanism is necessary in order to transfer the command. The principle of such a call for a "remote" action (procedure) via a communication protocol is known and is called a "remote procedure call". In connection with the Ajax concept, this is normally conducted via calling up a SOAP Web service or a comparable XML-based Web service dialect. The principal disadvantages with the use of XML are the less compact format for the transfer and the complicated type of access to information. With JSON (JavaScript object notation), a compact format is available, which can be evaluated directly in JavaScript—objects transmitted with JSON or JSON-RPC are available directly as JavaScript objects. Therefore, JSON-RPC is preferably used for transmitting commands 710 between the engineering application 310 in browser 110 and control engine 410 on control 400. Commands 710 transferred with JSON-RPC are transformed into a call for a corresponding action of control engine 410 in HTTP—server 420 of control 400.

JSON and JSON-RPC are described, for example, in the article found on the Web page "http://www.heise.de/ix/artikel/2006/01/070/", whereby the content of this Web page at the time point of the application is incorporated herein by reference.

A message 720 is a notification from control engine 410 to engineering application 310. A problem here is that the HTTP communication that is the basis for it can be initiated basically only from the page of the client, i.e., in the browser. An application running in the browser must therefore be able to receive messages from the server while sending corresponding requests to the server (polling). This method leads to unnecessary communication, which might in turn overload, in particular, the limited resources of the HTTP server 420 and thus control 400. A mechanism is known under the name Comet, which makes possible a transfer of data that is initiated by the server. A corresponding expansion of HTTP server 420 is provided for using Comet, but no expansions or plug-ins are necessary on the page of browser 110, so that, in addition, a standard browser is sufficient.

Comet is described, for example, in the article found on the Web page "http://www.entwickler.com/zonen/portale/psecom,id,101,online,.1151.html", whereby the content of this Web page at the time point of the application is incorporated herein by reference.

Industrial controls are predominantly proprietary solutions based on the special requirements of the different fields of application. They are distinguished both in the arena of the hardware used, which is particularly determined by the microcontroller platform utilized, as well as by the operating system that is used. In comparison to the Windows PC, which makes available a very stable platform, this involves a considerable expenditure for software portability for the specific devices in each case. The invention thus preferably provides for implementing both control engine 410 as well as HTTP server 420 with the means of the Microsoft .Net language family, which is translated into a standardized intermediate language (CIL—Common Intermediate Language) and is executed in a corresponding runtime environment. This runtime environment is called CLR—Common Language Runtime and is available under the name embedded CLR also for different microcontroller platforms. This embodiment makes possible a simple portability of Web engineering to different embedded devices, since both control engine 410 as well as HTTP server 420 are implemented relative to a standard environment.

In typical Internet scenarios, computers on which Web servers run are appropriately powerful machines, in fact, they are frequently a group of crosslinked computers—so-called server farms, which permit them to be able to always maintain sufficient performance for the different processes. A memory-programmable control primarily has the task of controlling a process that is connected via its system of peripherals. In particular, in the case of control devices which are designed as compact and mini controls, free computing power is hardly available for additional tasks. The conception of a Web-based control system according to the invention takes this into consideration, on the one hand, by the above-described moving of engineering application 310 into browser 110. HTTP server 420 and its communication to engineering application 310 now still require additional computing power of control 400. For a perfect functioning of control engine 410, this engine must preferably have sufficient resources for processing control application 600 and should not be adversely affected by, e.g., the HTTP communication to engineering application 310. As is usual in the case of industrial controls, typically the input signals of the connected peripheral 700 are read in by control engine 410 at the beginning of each one of these cycles, then the automating functions corresponding to the current control application 600 are executed and at the end of the cycle, the output signals are output via the connected peripheral 700. The HTTP server 420 is activated if an HTTP request occurs or control engine 410 deposits a corresponding message 720. The processes for executing control engine 410 and HTTP server 420 are particularly advantageously managed via threads and a dynamic priority control. The dynamic priority control assures that control engine 410 has allocated sufficient computing time in order to be able to process control application 600.

Classical engineering tools for memory-programmable controls recognize two basic states, which are normally called online and offline. Offline in this case means that the engineering tool is not connected to the control and the control application can only be edited. To transfer the control application, a communication connection is produced between the engineering computer and the control, by means of which the engineering tool then transfers the corresponding data to the control. In contrast to this, an engineering tool created on the basis of Web technologies is typically always online, since a browser-based application can operate limited in principle only relative to cooperation with the server. In the case of an engineering tool in the form of a self-contained desktop application, applications are, however, for the most part offline, i.e., independent of the automating device. In order to cover this application case, HTTP server 420 and control engine 410 are advantageously installed on the same computer on which browser 110 with engineering application 310 is also running. This installation procedure can be provided by a data media device, such as, for example, a CD or DVD, over the Internet, for example, via the Homepage of a device manufacturer, or even directly from control 400. Additionally, the process peripheral device 700, which is now no longer physically available, can be replaced by a simulation component. In this way, it is also possible to execute control application 600 offline.

The field of application of the invention, in particular, of a method according to the invention and/or a control device according to the invention, and thus the described mechanisms of a Web-based control system is (are) industrial memory-programmable controls (SPS/PLC), in particular, but can also be security-directed systems and especially combinations of security-directed and non-security-directed types of automating functions. In addition, the described mechanism can advantageously be used as a basis for Web-based "operate and observe" functions and their display systems.

The invention claimed is:

1. A method for accessing a control module that can be executed in a control device for controlling an automating system, wherein the control module is designed for the purpose of executing a control function on the control device, comprising the steps of:
   providing the control module in the control device,
   providing a first interface module in the control device,
   providing a second interface module in the control device,
   connecting the control device with an operating device via a network,
   transferring the second interface module from the control device to the operating device, whereby the operating device comprises input and output devices for operation by a user,
   executing the second interface module by the operating device, and
   transferring data between the first and the second interface modules, wherein the data transfer between the first and second interface modules serves for the purpose selected from the group consisting of creating, processing and/or executing the control function that can be executed on the control device, transferring parameters to the control device, reading out process data from the control device and any combinations thereof.

2. The method according to claim 1, wherein the data transfer between the first and the second interface modules is initiated in response to user input on the operating device.

3. The method according to claim 2, wherein the data transfer between the first and the second interface modules is initiated by the operating device.

4. The method according to claim 1, wherein the data transfer between the first and the second interface modules is initiated by the control device.

5. The method according to claim 1, wherein the network is an IP-based network.

6. The method according to claim 1, wherein the first interface module comprises an HTTP server application and the second interface module comprises a client application designed for communication with the HTTP server application.

7. The method according to claim 1, wherein the second interface module comprises a Web-based application, which is designed for execution in a Web browser.

8. The method according to claim 1, further comprising conducting communication between the first and second interface modules by means of Asynchronous JavaScript and XML with the use of JavaScript Object Notation.

9. The method according to claim 1, wherein the control module and/or the first interface module comprise(s) an intermediate code.

10. The method according to claim 1, wherein the control device comprises a module for providing a runtime environment, which is designed for the purpose of executing the control module and the first interface module in parallel.

11. The method according to claim 1, wherein the data are transferred from the first interface module to the second interface module and the data received are processed by means of the first interface module by control device at pre-established times, whereby the pre-established times for the real-time requirements set by the process for executing the control module can be adapted dynamically to the runtime.

12. The method according to claim 11, wherein the control module is executed with a higher priority than the first interface module.

13. The method according to claim 11, wherein the control device is connected to process components by means of which changes are made in the process run.

14. The method according to claim 1, wherein, for offline processing of the control function, the operating device and the control module are disposed in a common computer system and the process controlled by the control module is simulated by a simulation module.

15. A control device of a control system for controlling an automating system, comprising:
 a memory with a control module stored therein for process control of the automating system and a first and a second interface module stored therein in each case, wherein the control module is designed for the purpose of executing a control function on the control device,
 a processor unit for executing the control module and first interface module, and
 a network interface for connecting the control device with a network, whereby the control device is designed for the purpose of transferring the second interface module to an operating device via the network and the first interface module is designed for the purpose of communicating with the second interface module disposed in the operating device via the network, wherein the control device is designed for the purpose of effecting the creation, processing, execution and/or parameterization of a control function that can be executed on the control device by the control module, as a function of data received via the first interface module.

16. The control device according to claim 15, wherein the second interface module is designed for the purpose of initiating a data transfer to the first interface module.

17. The control device according to claim 15, wherein the network is an IP-based network.

18. The control device according to claim 15, wherein the first interface module comprises an HTTP server application, which is designed for communication with a remote client application disposed in the second interface module.

19. The control device according to claim 18, wherein the remote client application comprises a Web-based application, which is designed for execution in a Web browser.

20. The control device according to claim 15, wherein the control module and/or the first interface module comprise(s) an intermediate code.

21. The control device according to claim 15, further comprising a module for providing a runtime environment, which is designed for the purpose of executing the control module and the first interface module in parallel.

22. The control device according to claim 15, wherein the control device is designed for the purpose of executing the transfer of data from the first to the second interface module and the processing of data received by means of the first interface module at pre-established times, whereby the pre-established times for the real-time requirements set by the process for executing the control module can be adapted dynamically to the runtime.

23. The control device according to claim 22, wherein the control device is wherein the control device is designed for the purpose of executing the control module with a higher priority than the first interface module.

24. The control device according to claim 15, wherein the control device which can be connected with process components that are designed for effecting changes in the process run.

* * * * *